Jan. 6, 1959 — M. L. FREEMAN — 2,867,239
VALVES
Filed May 4, 1956 — 3 Sheets-Sheet 1

INVENTOR
Mathew L. Freeman

INVENTOR
Mathew L. Freeman

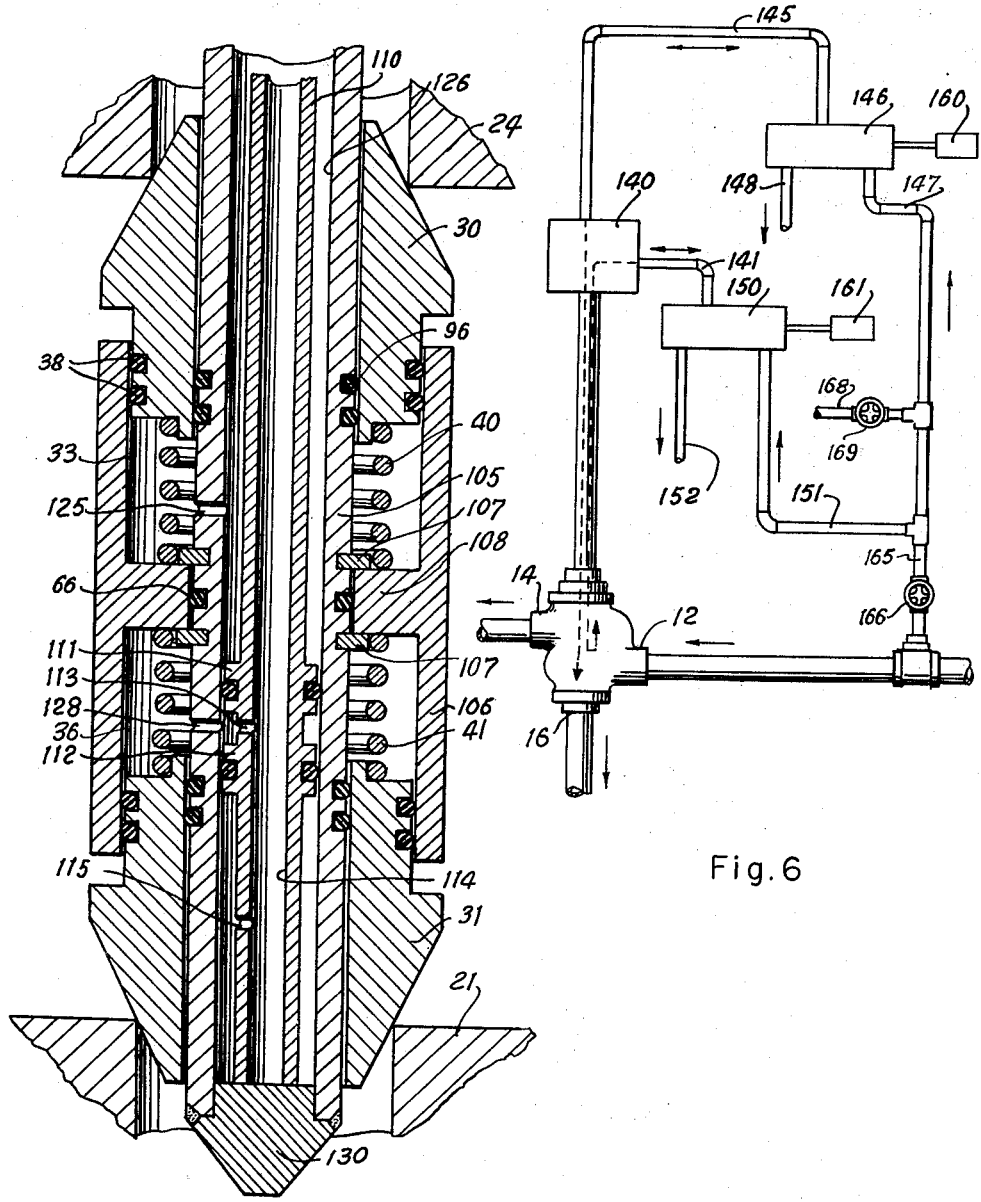

އ2,867,239

VALVES

Mathew L. Freeman, Houston, Tex.

Application May 4, 1956, Serial No. 582,881

9 Claims. (Cl. 137—627.5)

This invention relates to valves and more particularly to a pressure operated three-way valve.

One object of the invention is to provide a new and improved pressure operated three-way valve.

Another object is to provide a three-way valve having an inlet and a pair of outlets wherein the fluid entering through the inlet may be selectively directed through either of the outlets.

Still another object of the invention is to provide a pressure operated three-way valve wherein the pressure of the fluid passing through the valve may be employed to operate the valve.

A further object of the invention is to provide a valve having an inlet and a pair of outlets and having means for selectively closing off either or both of the outlets from the inlet.

An important object of the invention is to provide a valve, of the type described, wherein each outlet is selectively closeable from the inlet by individually acting plugs, each selectively operable by the pressure of an operating fluid.

A still further object is to provide a valve, of the type described, wherein the pressure of the fluid flowing into the valve through the inlet may be employed selectively to move either of the plugs to closed position.

A still further object of the invention is to provide a valve, of the type described, wherein the plugs are individually biased towards a closed position by individual resilient means.

A particular object of the invention is to provide a valve of the character described which is adapted to automatically close off all flow through said valve upon the occurrence of predetermined conditions, and wherein operating fluid pressure is trapped in the valve plug operating mechanism to positively hold the plugs closed even though operating fluid pressure outside the valve is exhausted or dissipated.

Another object is to provide a valve, of the type described, wherein the plugs are individually slidable in bores which are selectively vented to permit opening movement of the plugs under the pressure exerted by the fluid entering through the inlet.

Still another object is to provide a valve, of the type described, wherein the bores are vented by the operation of a valve rod which is operable from without the valve.

Another object is to provide a valve, of the type described, which is of simple and economical construction and which functions through the medium of the fluid pressure of the gas whose movement it controls.

Additional objects and advantages of the invention will be readily apparent from the reading of the following description of a device constructed in accordance with the invention, and reference to the accompanying drawings thereof, wherein:

Figure 6 is a partly schematic view of a modified form of valve and its controls; and Figure 7 is an enlarged vertical sectional view of the operating mechanism of the valve of Figure 6.

Figures 1, 2, 3:
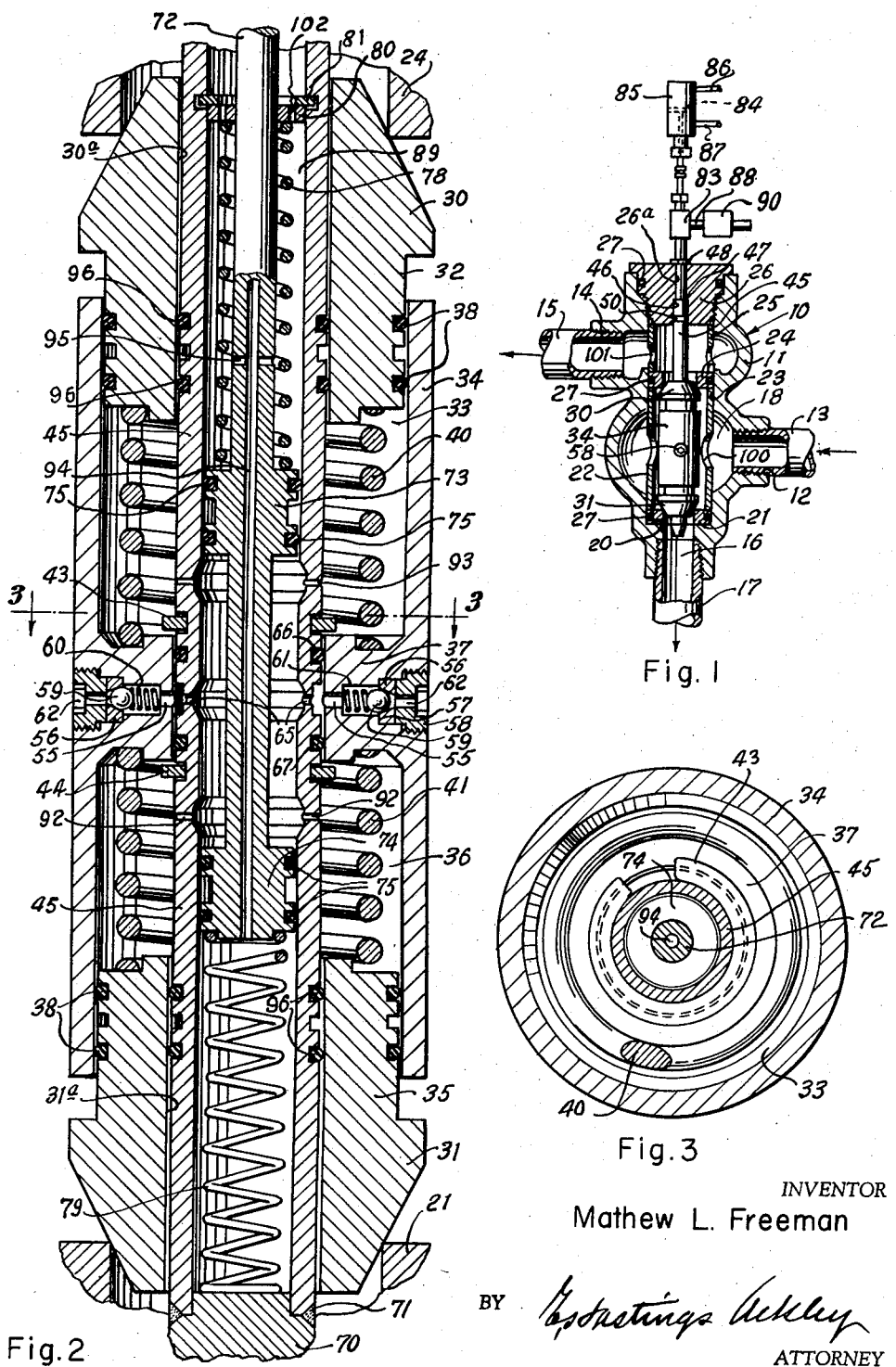
Figure 1 is a vertical sectional view, partly in elevation and partly in section, of the three-way pressure operated valve of the invention.
Figure 2 is an enlarged vertical sectional view, showing only the operating elements of the valve, with the plugs in closed position, whereby no fluid flows into the outlets of the valve.
Figure 3 is a horizontal sectional view taken on line 3—3 of Figure 2.

Referring now to the drawings, the three-way pressure operated valve 10 of the invention includes a body 11 having an inlet 12 into which may be threaded an inlet conductor 13, an upper outlet 14 into which may be threaded an outlet conductor 15, and a lower outlet 16 into which may be threaded a lower outlet conductor 17. The inlet and the outlets communicate with a central passageway or chamber 18 in the body 11.

The valve body 11 is provided adjacent the lower outlet 16 with an internal annular shoulder 20 on which rests an annular valve seat 21. A cylindrical lower spacer sleeve 22 has its lower end resting on the annular valve seat 21 and extends upwardly into the constricted portion 23 of the central passageway 18 where it supports an upper annular valve seat 24. An upper spaced sleeve 25 in turn rests on the upper valve seat 24 and is engaged at its upper end by a stop plug 26 threaded in the upper end of the valve body 11, whereby the stop plug positively securely holds both spacer sleeves and valve seats in their proper positions in the valve passageway. The upper and lower valve seats and the stop plug are provided with sealing means 27 to seal between these elements and the internal wall of the valve body.

An upper valve plug 30 cooperates with the upper valve seat 24 to prevent flow of fluid from the inlet 12 to the upper outlet 14. A similar lower valve plug 31 cooperates with the lower valve seat 21 to prevent flow of fluid from the inlet 12 to the lower outlet 16. The upper valve plug 30 has a reduced lower portion or shank 32 which is received slidably in the upper bore 33 of an elongate tubular sleeve or housing 34. The upper reduced portion or shank 35 of the lower plug 31 is received slidably in the lower bore 36 of the tubular sleeve or housing. The upper and lower bores of the tubular sleeve are separated by an internal annular flange 37 formed substantially medially of said sleeve. The reduced portions or shanks of the upper and lower valve plugs are provided with sealing means, such as the O-rings 38, to seal between said shanks and the tubular sleeve or housing. The upper and lower valve plugs 30 and 31 are biased toward their valve seats 24 and 21, respectively, by resilient means such as helical springs 40 and 41, respectively, which are disposed within the tubular sleeve and bear against the internal annular flange 37 and against the upper and lower valve plugs.

The tubular sleeve or housing 34 is supported in proper position within the valve body by means of an elongate tubular mandrel 45 having lock rings 43 and 44 mounted in suitable external annular grooves in said mandrel and engaging the upper and lower surfaces of the internal flange 37 in the tubular sleeve 34. The elongate mandrel 45 extends axially through the longitudinal axial bores 30a and 31a formed in the plugs 30 and 31, and through an axial bore 26a in the stop plug 26, and thence exteriorly of the valve body 11. The bore 26a of the stop plug is provided with a downwardly facing internal annular shoulder 46 which cooperates with an upwardly facing external annular shoulder 47 on the tubular mandrel to limit upward movement of said mandrel with respect to the valve body 11. Downward movement of the tubular mandrel is limited by the lock ring 48 secured on the mandrel which bears against the upper end of the stop plug. The mandrel is also provided with an external annular recess in which is disposed a sealing means, such as an O-ring 50, which seals between the stop plug and said mandrel.

The sleeve 34 is provided with a plurality of lateral inlet ports 55 which extend through the annular flange 37 thereof and provide communication between the exterior and interior of said sleeve. Each of the ports is provided with a valve seat 56 which is held in place against an annular shoulder 57 in the port by a lock bushing or ring 58 threaded in the outer end of the port. A ball check valve 59 is biased outwardly against each valve seat 56 by a spring 60 whose opposite ends bear against the ball check valve and against an internal annular shoulder 61 near the inner end of the port. It will be seen that fluid may flow through the bore 62 of each lock ring and its associated valve seat, and then past the ball check valve and through the port 55 into the interior of the tubular sleeve 34 whenever the fluid pressure externally of the tubular sleeve is of sufficient force to overcome the resistance of the spring 60 and move the ball check valve 59 inwardly to open position. The tubular mandrel 45 is also provided with intermediate lateral ports 65 which register and communicate with the ports 55 of the tubular sleeve. The mandrel is also provided with sealing means, such as the O-rings 66 and 67, disposed above and below the lateral ports 65 and in sealing contact with the flange 37 above and below the ports 55 to direct flow of fluid from the lateral ports 55 of the tubular sleeve through the ports 65 into the bore of the tubular mandrel 45.

The mandrel 45 has its lower end closed by a plug 70 which may be secured thereto by a weld 71 or by any other suitable means. An elongate slidable valve rod 72 extends axially downwardly into the mandrel 45 and is provided with an upper piston 73 and a lower piston 74, each of which is provided with sealing means, such as the O-rings 75, to seal between the pistons and the inner wall of the tubular mandrel. The valve rod 72 is biased toward the position shown in Figure 2 by a pair of opposed springs 78 and 79. The upper spring 78 is disposed about an intermediate portion of the valve rod 72 and has its lower end engaging the upper end of the upper piston 73, and its upper end bearing against an apertured disk 80 held against upward movement by a split lock ring 81 engaged in a suitable internal annular recess in the bore of the mandrel 45. The lower spring 79 has its lower end bearing against the plug 70 at the lower end of the mandrel 45 and its upper end bearing against the lower end of the lower piston 74 of the valve rod 72. The opposing forces of the springs 78 and 79 are so chosen that unless an external force is applied to the valve rod 72, the pistons 73 and 74 thereof are held by the springs in the position shown in Figure 2.

The upper end of the valve rod 72 extends upwardly and outwardly through a fitting 83 at the upper end of the mandrel 45, and is operatively connected to the piston 84 of an air or hydraulic cylinder 85. Thus, when air under pressure is introduced into the air cylinder 85 through the inlet 86, the valve rod is moved downwardly against the resistance of the spring 79, and when air is introduced into the air cylinder 85 through the inlet 87, the valve rod is moved upwardly against the resistance of the spring 78.

The fitting 83 at the upper end of the tubular mandrel 45 is provided with a venting tube 88 which communicates with the internal bore 89 of the mandrel. A velocity check valve 90 is connected in the venting tube for a purpose which will be hereinafter more fully explained.

The tubular mandrel 45 is provided with a plurality of lower lateral ports 92 which establish communication between the internal bore 89 of the mandrel and the lower bore 36 of the cylindrical sleeve 34. The tubular mandrel is also provided with a plurality of upper lateral ports 93 which communicate between the internal bore 89 of the mandrel and the upper bore 33 of the cylindrical sleeve.

The valve rod 72 has a longitudinal bore 94 which extends from the lower end thereof to a point above the upper piston 73 and is also provided with a plurality of lateral apertures 95 above the upper piston which afford communication between the bore 94 of the valve rod and the bore 89 of the mandrel. The upper and lower valve plugs 30 and 31 are slidable on the mandrel 45, and sealing means, such as the O-rings 96, are carried by upper and lower sets of external annular grooves formed in the mandrel to seal between the mandrel and each of the valve plugs.

When the slide rod 72 is in the position shown in Figure 2, with the upper piston 73 positioned above the lateral ports 93 of the mandrel 45 and with the lower piston 74 positioned below the lower lateral ports 92 of said mandrel, the upper valve plug 30 and the lower valve plug 31 are held in the closed positions shown by the forces exerted by the springs 40 and 41 and by the pressure of the fluid in the passageway 18 of the valve body. This fluid moves from the inlet 12 through the lateral ports 100 of the cylindrical spacer sleeve 22 to the lateral ports 55 of the tubular sleeve 34, moving the ball check valves 55 inwardly when such pressure is greater than the pressure in the bore of the tubular mandrel 45. The fluid enters into the longitudinal bore 89 of the mandrel through the intermediate lateral ports 65 and flows through said bore to the lateral ports 93 and 92 and thence into the bores 33 and 36, respectively, of the sleeve 34, where it acts against the inner ends of the valve plugs 30 and 31 to bias them toward their valve seats 24 and 21, respectively. The pressure of the fluid from the inlet also acts on the outer surfaces of the plugs 30 and 31 not closed off by the seats 24 and 21, respectively, to tend to move the plugs 30 and 31 toward open position; but, since these outer surfaces present a smaller cross-sectional area than the area of the inner ends of the shanks of the valve plugs, the fluid pressure in the bores 33 and 36 acts in concert with the forces exerted by the springs 40 and 41 to hold the valve plugs closed. The ball check valves 59 prevent accidental opening of the plugs 30 and 31, caused by any loss of pressure in the body which might arise as a result of loss of pressure in the inlet conductor, to prevent back flow of fluid from the outlet conductor, thus causing the valve to act as a safety or back flow check valve in the event of loss of pressure in the upstream conductor.

When it is desired to permit fluid to flow from the inlet 12 to the upper outlet 14, the valve rod 72 is moved to the position shown in Figure 4 wherein the upper piston 73 is disposed between the upper lateral ports 93 and the intermediate lateral ports 65 of the tubular mandrel and the lower piston 74 is positioned below the lower lateral ports 92 of said mandrel. It will be apparent that with the pistons in these positions, fluid from the inlet may flow into the lower bore 36 of the tubular sleeve 34 through the ports 55 and 92 of the mandrel. This insures that the lower valve plug 31 is maintained in its closed position. The upper bore 33 of the sleeve, however, is now sealed off from the lateral ports 55 by the upper piston 73, so that the fluid pressure within the bore 33 is vented to atmosphere through the ports 93 and the bore 89 of the mandrel which communicates with the venting tube 88 through the velocity check valve 90, and only the force of the spring 40 now opposes downward movement of the upper plug 30 toward closed position. The inlet pressure now acting on the unbalanced outer surfaces of the plug 30, represented by the difference between the smaller cross-sectional area of the valve seat opening 24 and the larger cross-sectional area of the shank of the valve plug, causes it to move downwardly to open position. Any fluid which may have been trapped in the bore 33 is vented to the surface through the ports 93 of the mandrel into the longitudinal bore 89 thereof, and through the apertures 102 of the disc 80 to the vent pipe 88 as the valve plug is moved downwardly.

Figure 5:
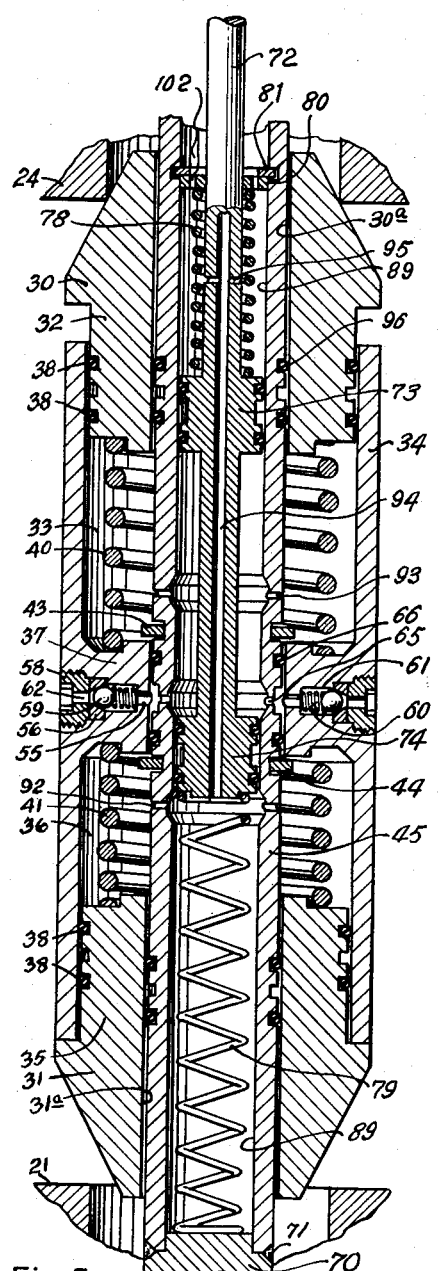
Figure 5 is a vertical sectional view similar to Figure 2 showing the lower plug in open position.

When it is desired to direct the flow of fluid from the inlet 12 to the lower outlet 16, the valve 72 is moved upwardly to the position shown in Figure 5, wherein the lower piston is positioned between the intermediate lateral ports 65 and the lower ports 92 of the mandrel while the upper piston 73 is positioned above the upper lateral ports 93 of the mandrel. Fluid from the inlet 12 can no longer reach the bore 36 of the tubular sleeve 34, since the lower piston is positioned between the intermediate lateral port 65 and the lower lateral ports 92 of the tubular mandrel, and fluid pressure in said bore 36 is vented to atmosphere through the bore 94 and ports 95 of the valve rod and the bore 89 of the mandrel and the venting tube 88. Accordingly, since the upward movement of the lower valve plug 31 is now resisted only by the force of the spring 41, the pressure of the fluid from the inlet acting on the effective area of the outer surfaces on the valve plug 31 now moves the valve plug upwardly to the open position shown. Any fluid trapped in the cylindrical bore 36 is vented to the atmosphere through the lower lateral ports 92 into the longitudinal bore 89 of the inner mandrel and thence through the longitudinal bore 94 and the lateral ports 95 of the valve rod 72 to the portion of the longitudinal bore 89 disposed above the upper piston of the valve rod and does not prevent upward opening movement of the valve plug. In the meantime, the upper valve plug 30 is positively maintained in closed position since the fluid pressure from the inlet 12 may enter into the upper bore 33 through the intermediate lateral ports 65 and the upper lateral ports 93 of the tubular mandrel.

It will now be apparent that a new and improved three-way valve has been described and illustrated which includes an inlet 12 and two outlets 14 and 16 which are selectively closable by valve plugs 30 and 31. It will also be apparent that the fluid pressure from the inlet acts on the inner ends of the plugs to bias them toward closed positions, while at the same time it acts on the outer surfaces of the valve plugs to move them toward open positions, and when the pressure acting on the inner shank ends of the valve plugs is vented to atmosphere, the pressure acting upon the outer unbalanced areas of the valve plugs tends to move to open positions.

Figure 4:
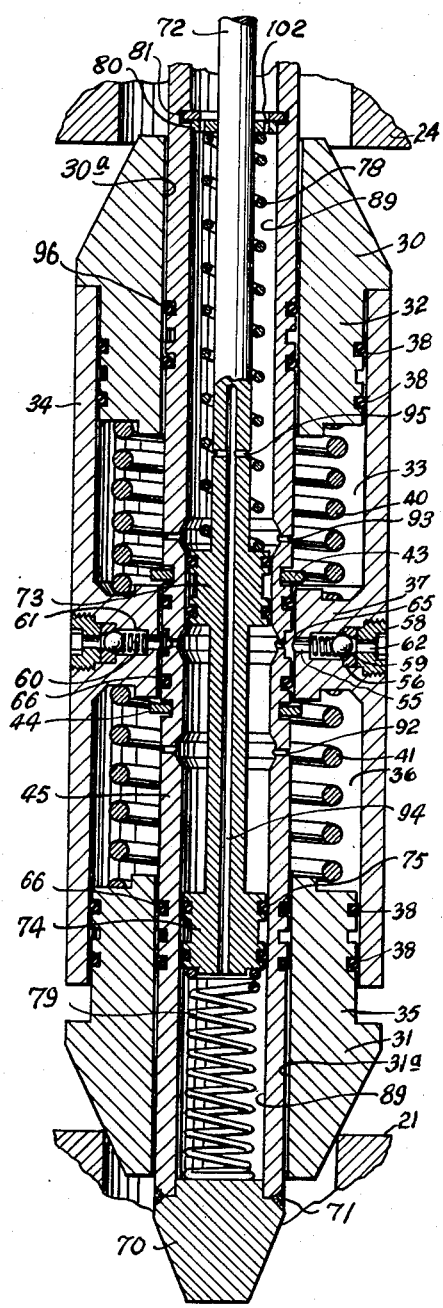
Figure 4 is a vertical sectional view similar to Figure 2 showing the upper plug in open position.

It will also be apparent that a valve rod 72 has been provided which controls the admission of operating fluid into the bore of the sleeve 34 to act on the valve plugs, and when in the intermediate position shown in Figure 2 insures that the operating fluid will move the valve plugs 30 and 31 toward closed positions, but when in the lower position shown in Figure 4 cuts off the flow of inlet fluid to the bore 33 and simultaneously vents the bore 33 to the atmosphere so that the inlet pressure acts only to move the upper valve plug 30 toward open position, and when the valve rod 72 is in such lower position insures that operating fluid is admitted to the bore 36 to utilize the pressure thereof to maintain the valve plug 31 in a closed position. It will also be apparent that when the valve rod 72 is moved to the upper position shown in Figure 5, it cuts off the operating fluid from the bore 36 and vents said bore to atmosphere, so that the pressure of the operating fluid acts only on the lower valve plug 31 to move the same to open position. At the same time the valve rod permits the flow of operating fluid to the bore 33 to hold the upper valve plug 30 in closed position. It will also be apparent that the provision of the check balls 59 prevents movement of the valve plugs toward open position unless the valve rod is in the proper position to permit the bores to vent to the outside atmosphere. It will also be apparent that a new and improved three-way valve has been illustrated and described which is simple in construction and will operate under the forces exerted by the pressure of the operating fluid, which may be the inlet fluid itself; but, if desired, the bore 89 of the tubular mandrel may be connected to an external source of fluid under pressure so that the valve plugs may be made to operate independently of the inlet pressure.

A modified form of the invention is illustrated in Figures 6 and 7, wherein the valve is operated by a fluid pressure from a source independent of the fluid flowing through the valve. In this form of the valve, the valve operating mechanism, and only the valve operating mechanism, differs from that form of the valve previously illustrated, and for this reason similar numbers will be given to the valve seats 21 and 24 and to the upper and lower valve plugs 30 and 31 and their associated parts. The tubular mandrel 105 carries the outer tubular valve sleeve or housing 106 in the same manner as the sleeve 34 was carried by the mandrel 45 in the form previously described, said sleeve being held in place on the mandrel by means of a pair of spaced snap rings 107 which are positioned in suitable external annular grooves formed in the mandrel and disposed above and below the internal annular flange 108 formed medially of the bore of the sleeve 106. The upper and lower valve plugs are biased toward closed positions by springs 40 and 41, respectively, and the valves serve to close off flow through the seats 24 and 21, respectively, in the valve body in the manner already described. A valve rod 110 is concentrically mounted in the bore of the tubular mandrel 105, and this valve rod carries a pair of spaced pistons formed externally thereon, an upper piston 111 and a lower piston 112, said rod having a lateral port 113 formed therein between the pistons and providing communication between the exterior of the rod and the longitudinal bore 114 of said rod. A lateral port 115 may be formed in the wall of the rod below the piston 112. Sealing means, such as O-rings 120, are positioned in suitable external annular grooves formed in the pistons 111 and 112 to seal between said pistons and the bore wall of the tubular mandrel 105. A lateral flow port 125 is formed in the wall of the tubular mandrel 105 above the flange 108, and provides communication between the bore 126 of said mandrel and the chamber or bore 33 in the upper portion of the sleeve 106, so that fluid pressure passing through said port may act on the reduced lower shank of the valve plug 30 in conjunction with the spring 40 to bias the plug outwardly of the sleeve toward seating engagement with the seat 24. Similarly, a port 128 formed in the wall of the mandrel 106 below the flange 108 provides communication between the lower bore 36 of the sleeve 106 and the bore 126 of the mandrel 105, whereby fluid pressure passing through the port may act on the reduced inner end or shank of the valve plug 31 in the manner already described to co-act with the spring 41 to bias the plug toward closed position.

The lower end of the tubular mandrel 105 is closed by a suitable plug 130 secured therein by welding or any other suitable manner, and the lower end of the valve rod 110 engages the plug to limit downward movement of said rod in said mandrel. The upper end of the mandrel is connected to a stuffing box or bushing 140 having a lateral flow port or conductor 141 communicating therethrough with the bore of the mandrel. The upper end of the valve rod 110 extends upwardly through the bushing and is connected at its outer end with a suitable conductor 145 leading to an operating fluid control valve 146 which has one conduit 147 connected to a suitable source of fluid pressure and another conduit 148 communicating with the atmosphere, whereby the bore of the valve rod 110 may be subjected to pressure of the operating fluid or may be vented to atmosphere, depending upon the position of the valve 146. Similarly, the conductor 141 from the bushing extends to a valve 150 which likewise has a pressure conductor 151 and a vent 152 connected therewith, whereby pressure fluid may be introduced through the conductor 151 to the bore 126 of the tubular mandrel 105, or the bore of the mandrel may be exhausted to atmosphere through the vent 152.

With the operating mechanism in the position shown in Figure 7, operating fluid pressure may be introduced through the bore 114 of the valve rod and will pass through the ports 113 and 128 into the chamber or bore 36 to act on the inner end of the shank of the lower valve plug 31 to cooperate with the spring 41 to hold the plug in closed position. Simultaneously, the chamber or bore 33 is placed in communication through the port 125 with the bore 126 of the mandrel 105, and any fluid pressure therein is then conducted through the bushing 140 and the conductor 141 to the valve 150, where it is vented to atmosphere through the vent outlet 152. Under these conditions, the lower valve plug is closed and the upper valve plug is open, and fluid flow may take place from the inlet 12 of the valve body to the upper outlet 14 thereof, through the seat 24.

Conversely, the operating fluid pressure may be introduced into the bore of the mandrel 105 and permitted to pass through the port 125 into the chamber or bore 33 to act on the inner end of the upper valve plug 30 to move the same upwardly to closed position; and, simultaneously, the fluid pressure in the chamber or bore 36 may be vented to atmosphere through the ports 128 and and 113 and the bore 114 of the valve rod 110, whereupon the lower valve plug 31 will be moved to open position by the pressure of the fluid from the inlet opening of the valve acting on the outer unbalanced area of the valve plug, as has already been explained.

Obviously, if desired, operating fluid pressure may be applied to both the bore 114 of the valve rod 110 and to the bore 126 of the mandrel 105, and both valve plugs may be positively held in closed position. Similarly, both the chamber or bore 33 and the chamber or bore 36 may be vented through the bore 126 of the mandrel 105 and through the bore 114 of the valve rod 110, respectively, to permit both valve plugs to be moved to open position simultaneously.

The functioning of the valve is controlled by suitable controller mechanisms 160 and 161 acting upon the valves 146 and 150, respectively, whereby the valves are moved to positions admitting operating fluid pressure to the bore of their respective elements, or to positions venting the bores of their respective elements, to cause the desired functioning of the valve plugs.

It is believed manifest that the operating fluid may be taken by a suitable conduit 165 from the upstream conductor ahead of the valve 10, and may be passed through the control valves 146 and 150 to operate the valve plugs. Also, if desired, the operating fluid from such upstream conductor may be cut off by a valve 166 in the conductor 165, and an operating fluid from an independent source of pressure may be directed by the conductors 147 and 151 by means of a conductor 168 having a valve 169 connected therein. Thus, operating fluid from either source may be utilized by selective operation of the valves 166 and 169.

From the foregoing, it will be seen that a further improved and simplified form of three-way valve has been described and illustrated which provides for positive actuation of the valve plugs by hydraulic pressure means controlled by a suitable control mechanism exteriorly of the valve. Obviously, the control mechanism may be automatically actuated or may be actuated in response to predetermined conditions of flow, time or other variables, impressed upon the controller mechanism. In either case, the valve plugs are adapted to be moved toward open position by the pressure of the fluid flowing through the valve acting on the unbalanced outer areas of the valve plugs. Similarly, both valve plugs are operated by hydraulic fluid pressure, and either or both valves may be simultaneously closed or opened, or either may be opened independently of the other, depending upon the desired conditions of flow, and the admission of operating fluid to the valve or the venting of such fluid from within the valve operating mechanism.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A three-way valve comprising: a body having an inlet, a first outlet and a second outlet; a tubular sleeve disposed in said body between said inlet and said outlet; means dividing the bore of said sleeve into separate chambers at its opposite ends; a pair of valve plugs slidable in said separate chambers in the opposite ends of said tubular sleeve between positions opening and closing said outlets; means sealing between said valve plugs and said sleeves; resilient means within said tubular sleeve biasing each of said valve plugs in opposite directions toward closed positions to prevent flow of fluid from said inlet to one of said outlets, said valve plugs being exposed to the pressure of the fluid from the inlet which tends to move said valve plugs toward open positions again the force of said resilient means, and interconnected valve means communicating with both said chambers for selectively introducing pressure of an operating fluid into said separate chambers in said tubular sleeve selectively to bias said valve plugs toward closed positions, said valve means also providing for selectively releasing the pressure of the operating fluid from within each separate chamber to permit fluid pressure within the valve body to move the selected valve plug to open position.

2. A three-way valve comprising: a body having an inlet, a first outlet and a second outlet; a tubular sleeve disposed in said body between said inlet and said outlets; means dividing the bore of said sleeve into separate chambers at its opposite ends; a pair of valve plugs slidable in said separate chambers in the opposite ends of said tubular sleeve; each of said valve plugs being movable in its separate chamber between positions opening and closing one of said outlets; means sealing between said valve plugs and said sleeve; resilient means within said tubular sleeve biasing each of said valve plugs in opposite directions toward closed positions to prevent flow of fluid from said inlet to one of said outlets, said valve plugs being exposed to the pressure of the fluid from the inlet which tends to move said valve plugs toward open positions against the force of said resilient means; interconnected valve means communicating with both said chambers for selectively introducing pressure of an operating fluid into said separate chambers in said tubular sleeve selectively to bias said valve plugs toward closed positions; said valve means also providing for selectively releasing the pressure of the operating fluid from within each separate chamber to permit fluid pressure within the valve body to move the selected valve plug to open position; and means operable exteriorly of said valve body for controlling the operation of said valve means.

3. A three-way valve comprising: a body having an inlet, a first outlet and a second outlet; valve seats disposed between each outlet and said inlet; valve plugs seatable on said valve seats to prevent flow of fluid from said inlet to said outlets; a tubular sleeve disposed in said body having separate bores at opposite ends thereof, said valve plugs each having a reduced portion slidable in one of said bores and an enlarged portion disposed outwardly of said one of said bores and being larger than said one of said bores; means sealing between said reduced portion of each of said valve plugs and the wall of the sleeve bore in which said plug is positioned; resilient means in said bores biasing each of said valve plugs toward its valve seat, the exterior surfaces of said valve plugs being exposed to the pressure of the fluid from the inlet whereby the valve plugs are urged toward open position by the force of said pressure against the resistance of said resilient means; and interconnected valve means communicating with both said bores of said sleeve disposed within said tubular sleeve for admitting operating fluid into said bores selectively to hold said valve plugs in closed positions, said valve means being operable to selectively and separately release the pressure of said operating fluid from within each of said bores to permit the pressure of the fluid within the valve body to move a selected valve plug off its seat to permit flow from within the body through said seat and out said outlet.

4. A three-way valve comprising: a body having an inlet and a first outlet and a second outlet; a first valve seat disposed between said inlet and said first outlet; a second valve seat disposed between said inlet and said second outlet; a first valve plug cooperable with said first valve seat for preventing flow of fluid from said inlet to said first outlet; a second valve plug cooperable with said second valve seat to prevent flow of fluid from said inlet to said second outlet; a tubular sleeve disposed in said body between said inlet and said outlets, said tubular sleeve having a first bore which receives said first valve plug and having a second bore which receives said second valve plug; a tubular mandrel secured to the body and extending through said valve plugs and said tubular sleeve, said tubular sleeve being mounted on said mandrel in substantially fixed position between said valve seats; resilient means in said bores biasing said valve plugs in opposite directions toward closed positions, said tubular mandrel and said tubular sleeve having apertures for permitting flow of fluid from the valve inlet into the interior of the mandrel, said mandrel having apertures communicating with said bores of said tubular sleeve; and valve means slidable in said tubular mandrel for selectively preventing flow of fluid from the interior of said mandrel into the bores of the tubular sleeve.

5. A three-way valve comprising: a body having an inlet and a first outlet and a second outlet; a first valve seat disposed between said inlet and said first outlet; a second valve seat disposed between said inlet and said second outlet; a first valve plug cooperable with said first valve seat for preventing flow of fluid from said inlet to said first outlet; a second valve plug cooperable with said second valve seat to prevent flow of fluid from said inlet to said second outlet; a tubular sleeve disposed in said body between said inlet and said outlets, said tubular sleeve having a first bore which receives said first valve plug and having a second bore which receives said second valve plug; a tubular mandrel secured to the body and extending through said valve plugs and said tubular sleeve, said tubular sleeve being mounted on said mandrel in substantially fixed position between said valve seats; resilient means in said bores biasing said valve plugs in opposite directions toward closed positions, said tubular mandrel and said tubular sleeve having apertures for permitting flow of fluid from the valve inlet into the interior of the mandrel, said mandrel having apertures communicating with said bores of said tubular sleeve; and valve means slidable in said tubular mandrel for selectively preventing flow of fluid from the interior of said mandrel into the bores of the tubular sleeve; said valve means also selectively venting said bores.

6. A three-way valve comprising: a body having an inlet, a first outlet and a second outlet; a tubular sleeve disposed in said body between said inlet and said outlets; a pair of valve plugs slidable in the opposite ends of said tubular sleeve; means sealing between each valve plug and said sleeve; means dividing the bore of said sleeve into a pair of separate chambers in each of which one of said valve plugs is slidably disposed and movable between positions opening and closing one of said outlets; resilient means within said tubular sleeve biasing said valve plugs in opposite direction toward closed positions to prevent flow of fluid from said inlet to said outlets, said valve plugs having areas exposed to the pressure of the fluid from the inlet which tends to move said valve plugs toward open position against the force of said resilient means; means for conducting operating fluid into each of said separate chambers in said tubular sleeve to act on the ends of said valve plugs in said chambers; valve means interconnected in said sleeve for selectively controlling the flow of operating fluid pressure to said separate chambers to act on said valve plugs to selectively bias said valve plugs toward closed position; said valve means also providing for selectively and separately releasing the pressure of the operating fluid from within each of said separate chambers to permit said valve plugs to be moved to open position by fluid pressure entering the body through the inlet; and means operable exteriorly of said valve for controlling the operation of said valve means.

7. A three-way valve comprising: a body having a passageway therein; said body having an inlet communicating with said passageway intermediate its ends and a first outlet communicating with one end of said passageway and a second outlet communicating with the opposite end of said passageway; a valve seat disposed in said passageway between said inlet and said first outlet; a second valve seat disposed in said passageway between said inlet and said second outlet; a first valve plug cooperable with said first valve seat for preventing flow of fluid through said seat; a second valve plug cooperable with said second valve seat to prevent flow of fluid through said second valve seat; a tubular sleeve disposed in said passageway of said body between said outlets and having a first bore which receives said first valve plug and having a second bore which receives said second valve plug; a tubular mandrel secured to said body and extending through said valve plugs and said tubular sleeve, said tubular sleeve being mounted on said mandrel in substantially fixed position between said valve seats; resilient means in said bores of said tubular sleeve biasing said valve plugs into closing engagement with their respective seats; said mandrel having first and second apertures formed therein providing separate communication between the bore of said mandrel and the bores of said tubular sleeve; means providing conductors for introducing an operating fluid into said bores of said sleeve to bias said valve plugs toward closed position; and means for selectively controlling the introduction of such operating fluid into said bores to selectively bias said valve plugs toward closed position.

8. A three-way valve of the character set forth in claim 8 wherein the means for conducting an operating fluid through the apertures in the tubular mandrel into the chambers in the tubular sleeve comprises: a valve rod having sealing means thereon sealing between said valve rod and the tubular mandrel; said valve rod having a longitudinal flow passage therein disposed to communicate with one of the apertures of said tubular mandrel to conduct operating fluid pressure to said aperture and into the first bore of said sleeve to act on the first of said valve plugs; the space between said valve rod and said tubular mandrel providing a second pasage providing communication with the second aperture in said mandrel and the second bore to conduct operating fluid pressure to said second bore to act on the valve plug therein.

9. A three-way valve of the character set forth in claim 8 wherein the means for conducting operating fluid pressure to said bores to bias said valve plugs toward closed position comprises: means providing a lateral flow inlet passage through the wall of said tubular sleeve and through the wall of said tubular mandrel providing communication between the passageway of the body and the bore of said tubular mandrel; and the means for controlling the admission of operating fluid to said bores of said sleeve comprises: a valve rod slidable longitudinally in the bore of said tubular mandrel and having a pair of spaced pistons thereon; sealing means on said pistons sealing between said pistons and said tubular mandrel; said valve rod having a longitudinal flow passage hterein communicating with the bore of the tubular mandrel above and below said pistons; means normally retaining said valve rod in position with the pistons so disposed that the first and second apertures of said mandrel and said lateral flow inlet passage through the wall of said tubular sleeve and through the wall of said tubular mandrel communicate with the bore of said tubular mandrel between said pistons whereby fluid from said lateral flow inlet passage is directed into the first and second bores of said sleeve to act on said valve plugs; and means operable exteriorly of the valve for shifting the position of the valve rod to selectively position one of the pistons between said lateral flow inlet passage and the adjacent mandrel aperture to prevent flow of fluid from said lateral flow inlet passage into the corresponding bore of said tubular sleeve and simultaneously venting the other bore of said tubular sleeve.

References Cited in the file of this patent
UNITED STATES PATENTS

| | | |
|---|---|---|
| 742,422 | Hedlund | Oct. 27, 1903 |
| 932,262 | Ford | Aug. 24, 1909 |

UNITED STATES PATENT OFFICE

CERTIFICATE OF CORRECTION

Patent No. 2,867,239                               January 6, 1959

Mathew L. Freeman

It is hereby certified that error appears in the printed specification of the above numbered patent requiring correction and that the said Letters Patent should read as corrected below.

Column 2, line 44, strike out "slidably" and insert instead -- slidingly --; column 5, line 48, after "move" insert -- them --; column 8, line 25, strike out "again" and insert instead -- against --.

Signed and sealed this 26th day of May 1959.

(SEAL)
Attest:

KARL H. AXLINE                                          ROBERT C. WATSON
Attesting Officer                                    Commissioner of Patents